US009696839B1

(12) United States Patent
Bingle et al.

(10) Patent No.: US 9,696,839 B1
(45) Date of Patent: Jul. 4, 2017

(54) VEHICLE DOOR CONTROL (71) Applicants: Robert Bingle, Walker, MI (US); C. Bruce Banter, Northville, MI (US)

(72) Inventors: Robert Bingle, Walker, MI (US); C. Bruce Banter, Northville, MI (US)

(73) Assignee: ADAC PLASTICS, INC., Grand Rapids, MI (US)

( * ) Notice: Subject to any disclaimer, the term of this patent is extended or adjusted under 35 U.S.C. 154(b) by 52 days.

(21) Appl. No.: 14/215,465

(22) Filed: Mar. 17, 2014

Related U.S. Application Data (60) Provisional application No. 61/787,287, filed on Mar. 15, 2013.

(51) Int. Cl.
*G06F 3/041* (2006.01)
*B60R 25/00* (2013.01)
(Continued)

(52) U.S. Cl.
CPC ............ *G06F 3/0414* (2013.01); *B60R 25/00* (2013.01); *E05B 81/76* (2013.01); *E05B 85/00* (2013.01); *E05B 85/01* (2013.01); *E05B 85/10* (2013.01); *E05B 85/107* (2013.01); *G07C 9/00182* (2013.01); *G07C 9/00309* (2013.01);
(Continued)

(58) Field of Classification Search
CPC .............. G06F 3/0414; H04L 41/0813; G07C 9/00182; G07C 9/00309; G07C 2209/63; B60R 25/00; E05B 85/00; E05B 85/01; E05B 85/10; E05B 85/107; E05B 81/76; H01H 13/52; H01H 13/70
See application file for complete search history.

(56) References Cited

U.S. PATENT DOCUMENTS 5,668,357 A * 9/1997 Takiguchi ............ B60N 2/0228
200/302.1
5,952,630 A * 9/1999 Filion .................. B60N 2/4693
200/302.1

(Continued)

*Primary Examiner* — Thomas G Black
*Assistant Examiner* — Sze-Hon Kong
(74) *Attorney, Agent, or Firm* — Dickinson Wright PLLC (57) ABSTRACT

A user-actuatable vehicle door control, comprising: at least one force sensing member disposed beneath at least one force transfer member, the at least one force sensing member operative to detect the intensity of forces applied thereto, and the at least one force transfer member moveable upon user application thereto of one or more forces so as to transfer the one or more user-applied forces to one or more locations on the at least one force sensing member; and a controller operatively connected to the at least one force sensing member. The controller operates to: map the location and intensity of each of the one or more user-applied forces as detected by the at least one force sensing member; compare the mapped location and intensity information received from the at least one force sensing member to pre-defined force profiles, each pre-defined force profile corresponding to at least one pre-defined vehicle command; and direct the execution of one or more of the pre-defined vehicle commands when the mapped location and intensity information received from the at least one force sensing member corresponds to a pre-defined force profile associated with a vehicle command (such as, for instance, unlocking the vehicle's door(s), turning on exterior and/or interior lights, etc.).

24 Claims, 5 Drawing Sheets

(51) Int. Cl.
   *G07C 9/00*     (2006.01)
   *E05B 85/00*    (2014.01)
   *E05B 85/10*    (2014.01)
   *E05B 81/76*    (2014.01)
   *H04L 12/24*    (2006.01)
   *H01H 13/52*    (2006.01)
   *H01H 13/70*    (2006.01)

(52) U.S. Cl.
   CPC ............ *H01H 13/52* (2013.01); *H01H 13/70* (2013.01); *H04L 41/0813* (2013.01); *G07C 2209/63* (2013.01)

(56) References Cited

U.S. PATENT DOCUMENTS

| | | | | |
|---|---|---|---|---|
| 6,222,525 B1* | 4/2001 | Armstrong | ............ | G06F 3/0213 345/161 |
| 6,483,048 B1* | 11/2002 | Bontrager | ............ | B60R 13/0243 200/302.1 |
| 6,501,465 B2* | 12/2002 | Sandbach | ............ | G01L 1/205 178/18.05 |
| 6,765,158 B1* | 7/2004 | Morrison | ............ | H01H 13/70 200/341 |
| 7,002,089 B2* | 2/2006 | Stevenson | ............ | H01H 13/702 200/312 |
| 7,084,360 B2* | 8/2006 | Schmidt | ............ | H01H 13/702 200/5 A |
| 7,866,714 B2* | 1/2011 | Monig | ............ | E05B 81/76 292/336.3 |
| 8,823,639 B2* | 9/2014 | Jackson | ............ | G06F 3/011 345/156 |
| 2004/0223336 A1* | 11/2004 | Murakami | ............ | B60Q 1/2669 362/501 |
| 2005/0017842 A1* | 1/2005 | Dematteo | ............ | G07C 9/00309 340/5.72 |
| 2006/0232378 A1* | 10/2006 | Ogino | ............ | B60R 25/246 340/5.62 |
| 2007/0235297 A1* | 10/2007 | Stoschek | ............ | B60N 2/0228 200/5 R |
| 2007/0236450 A1* | 10/2007 | Colgate | ............ | G06F 3/016 345/156 |
| 2009/0279826 A1* | 11/2009 | Ieda | ............ | B60Q 1/2669 385/13 |
| 2010/0219935 A1* | 9/2010 | Bingle | ............ | E05B 81/76 340/5.54 |
| 2011/0057899 A1* | 3/2011 | Sleeman | ............ | G01L 1/146 345/174 |
| 2011/0115606 A1* | 5/2011 | Fu | ............ | G06F 3/033 340/5.83 |
| 2011/0199184 A1* | 8/2011 | Hachisuka | ............ | B60R 25/00 340/5.64 |
| 2012/0106182 A1* | 5/2012 | Minter | ............ | B60Q 1/2669 362/501 |
| 2012/0262396 A1* | 10/2012 | Jiyama | ............ | G06F 3/0414 345/173 |
| 2013/0076048 A1* | 3/2013 | Aerts | ............ | E05B 85/103 292/336.3 |
| 2013/0130674 A1* | 5/2013 | De Wind | ............ | B60Q 1/2619 455/420 |
| 2016/0004362 A1* | 1/2016 | Kring | ............ | G06F 3/0414 345/174 |

* cited by examiner

VEHICLE DOOR CONTROL

CROSS-REFERENCE TO RELATED APPLICATIONS

The present application relates to, and claims the benefit of priority from, U.S. Provisional Application Ser. No. 61/787,287, filed 15 Mar. 2013, the disclosure of which application is incorporated herein by reference in its entirety.

FIELD OF THE INVENTION

The present invention relates to user-actuatable vehicle door controls, such as may be incorporated into a vehicle door handle, for instance, and more specifically to such door controls which are operative via the detected location and intensity of applied forces to direct execution of one or more pre-defined vehicle commands.

BACKGROUND OF THE INVENTION

Vehicle outer-door access handles often utilize electro-mechanical switches or capacitive sensors to determine user interaction with the handle surface in order to initiate unlock/lock commands, input access codes via a keypad in the handle, etc.

While electro-mechanical switches are advantageous because of low cost and low drain on the vehicle's power system, they do have several drawbacks, including the following: First, electro-mechanical switches may include moveable buttons and actuators for a user to interact with. Yet, current handle design aesthetics favor "clean" surfaces with minimal gaps or disruptions. Second, only limited information about a user's interaction with the electro-mechanical switch can be obtained. Typically, for instance, only open and closed states of the switch can be determined. Third, the typical actuation forces required of electro-mechanical switches are around 8 Newtons, with travel distances typically being relatively great at at least 1.0 mm. Lower actuation forces and/or travel distances are difficult to design with electro-mechanical switches. Fourth, electro-mechanical switches can be difficult to seal with respect to the environment outside of the vehicle. Failed sealing can result in contamination or oxidation of the switch contacts, which in turn may result in switch failure. Fifth, electro-mechanical switches require tuning of the mechanical movement to achieve a desired "feel" for the user and to eliminate "button wobble." Sixth, the life of the mechanism is limited by the moving elements thereof. Seventh, 10 mS or more of contact "de-bounce" time is required to acquire a reliable state or output in the switch.

Capacitive sensors, by comparison, measure the change in a capacitive field generated on the touch surface. But while these sensors have their own advantages, they also have drawbacks, including the following: First, capacitive sensors have difficulty sensing covered (e.g., gloved) hands. Second, capacitive sensors have trouble discriminating between intended and inadvertent contacts, sometimes yielding an undesired effect (such as an unintended vehicle unlocking/locking). Third, capacitive sensors can be erroneously activated by water (such as from rain, car washes, etc.). Fourth, any conductive metal placed on the sensing surface can be interpreted as a touch. Fifth, touches on individual areas of the sensor cannot be distinguished from each other; the sensor can only determine whether or not contact has been made. Sixth, electromagnetic interference can be erroneously interpreted as a touch. Seventh, the long response time (>200 mS) often programmed into capacitive sensor systems to discriminate between a true touch and a false signal can be an annoyance to users desiring a more rapid response time.

SUMMARY OF THE DISCLOSURE

Disclosed herein is a user-actuatable vehicle door control, comprising: at least one force sensing member disposed beneath at least one force transfer member, the at least one force sensing member operative to detect the intensity of forces applied thereto, and the at least one force transfer member moveable upon user application thereto of one or more forces so as to transfer the one or more user-applied forces to one or more locations on the at least one force sensing member; and a controller operatively connected to the at least one force sensing member. The controller operates to: map the location and intensity of each of the one or more user-applied forces as detected by the at least one force sensing member; compare the mapped location and intensity information received from the at least one force sensing member to pre-defined force profiles, each pre-defined force profile corresponding to at least one pre-defined vehicle command; and direct the execution of one or more of the pre-defined vehicle commands when the mapped location and intensity information received from the at least one force sensing member corresponds to a pre-defined force profile associated with a vehicle command.

Per one feature, the vehicle command is selected from the group consisting of unlatching one or more of the vehicle's doors, turning on one or more of the vehicle's interior lights, turning on one or more of the vehicle's exterior lights, starting the car's engine, turning off one or more of the vehicle's interior lights, turning off one or more of the vehicle's exterior lights, recognition of at least a portion of an access code, and unlocking one or more of the vehicle's doors.

According to another feature, each at least one force sensing member is one of a strain gage, an optical sensor, an infra-red sensor, or a force sensing resistor.

Per still another feature, the vehicle door control is embodied in a door handle having front and rear surfaces. In one form, the at least one force transfer member is provided proximate each of the front and rear surfaces of the handle, and the at least one force sensing member operates to detect the intensity of forces applied thereto via each force transfer member. In one form, the at least one force transfer member comprises a resiliently deformable portion that is deflectable from an undeformed state thereof by a known amount in response to the application of a given amount of force, and the at least one force sensing member comprises a strain gage operative to measure the amount of deflection in the resiliently deformable portion from the undeformed state.

Per yet another feature, the controller comprises a printed circuit board. The printed circuit board may comprise one or more LEDs. Furthermore, the controller may operate to direct the selective illumination of one or more of the one or more LEDs when the mapped location and intensity information received from the at least one force sensing member corresponds to a pre-defined force profile associated with a vehicle command.

According to a still further feature, the at least one force transfer member comprises a resiliently deformable portion that is deflectable from an undeformed state thereof by a known amount in response to the application of a given amount of force, and the at least one force sensing member comprises an infra-red beam operative to measure the amount of deflection in the resiliently deformable portion from the undeformed state.

According to yet another feature, the at least one force sensing member comprises a plurality of force sensing resistors disposed in a regular array to define a plurality of predefined coordinates, and the controller is operative to map the location and intensity of each of the one or more user-applied forces using the predefined coordinates. In one form, the force transfer member comprises a deformable material which is directly contacted by a user, and the array of force sensing resistors are disposed directly adjacent the deformable material. The deformable material may have indicia provided thereon, the indicia including one or more of numbers, letters and symbols representing one or more vehicle commands. The door control may be embodied in one of a vehicle door handle, the B-pillar of a vehicle, or the exterior surface of a vehicle door.

Per a still further feature, the at least one force sensing member comprises a plurality of force sensing resistors; and the at least one force transfer member comprises a plurality of mechanical elements which are selectively moveable between first and second positions, each mechanical element contacting at least one of the force sensing resistors in the second position thereof, and each mechanical element being biased to the first position thereof.

According to yet another feature, the at least one force sensing member comprises a plurality of force sensing resistors, and the at least one force transfer member comprises a deformable component including one or more projections facing the at least one force sensing member. Each projection is arranged so as to be able to contact the at least one force sensing member as the at least one force transfer member is deformed. In one form, the one or more projections each extend to one of a plurality of distances from the deformable component. The plurality of distances may be the same, different, or a combination thereof. In one form, at least two of the plurality of distances are different.

According to another feature, a haptic device may be operatively connected to the control. The controller may further operate to actuate the haptic device to provide physical feedback to a user upon the application of force to the at least one force transfer member.

Per a further feature, the pre-defined force profiles each correspond to a plurality of locations and intensities of user-applied forces. In one form, each set of the plurality of intensities and locations of the user-applied forces for each pre-defined force profile define an activation threshold. In one form, the activation threshold for each pre-defined force profile is learned by the controller and corresponds to a particular set of locations and intensities of forces applied by a user to the force transfer member for the given force profile.

Per another feature, the pre-defined force profiles include at least two distinct sets of force profiles associated with at least two distinct users. The controller operates to associate each distinct force profile set with a unique code associated with a distinct key fob carried by each distinct user, and to use only the force profile set associated with the unique code detected.

BRIEF DESCRIPTION OF THE DRAWINGS

The foregoing and other features and advantages of the present invention may be better understood with reference to the specification and accompanying drawings, of which.

DETAILED DESCRIPTION

Referring now to the drawings, wherein like numerals indicate like or corresponding parts throughout the several views, there is disclosed in several embodiments a user-actuatable vehicle door control comprising at least one force sensing member disposed beneath at least one force transferring member. The at least one force sensing member is operative to detect the intensity of forces applied thereto, and the at least one force transferring member is moveable upon user application thereto of one or more forces so as to transfer the one or more user-applied forces to one or more locations on the at least one force sensing member. A controller is operatively connected to the at least one force sensing member. The controller is operative to receive information from the at least one force sensing members and to map the location and intensity of the one or more user-applied forces detected by the at least one force sensing member, to compare the mapped data to pre-defined force profiles, and to direct the execution of one or more pre-defined vehicle commands when the mapped data correspond to a pre-defined force profile associated with a vehicle command.

As explained further below, the at least one force sensing member may, by way of non-limiting example, be one or more strain gages, one or more optical sensors, one or more infra-red sensors, or one or more FORCE SENSING RESISTORS, or "FSRs" (Interlink Electronics, Inc., Camarillo, Calif. USA).

Figure 1A:
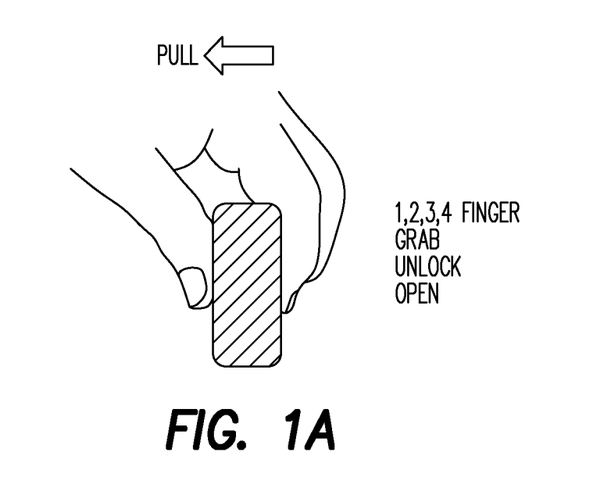
FIGS. 1a through 1c depict various positions of contact between a user and a vehicle door handle.
Figure 1B:
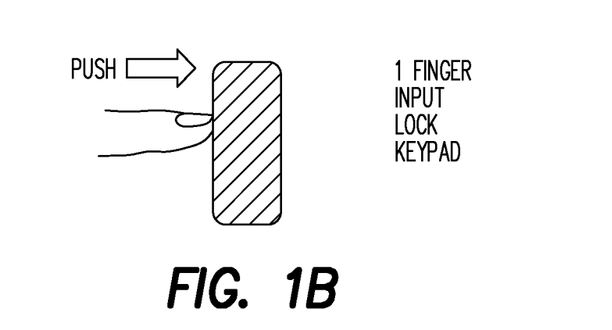

Referring to FIGS. 1a through 1b, the present invention permits the force of a user's intended input to be measured for intensity and duration to distinguish it from an inadvertent application of force to the vehicle door control, a false signal, etc. According to the embodiments described herein, the vehicle door control is more particularly a vehicle door handle. However, it will be appreciated, with the benefit of this disclosure, that the present invention may be adapted to other forms, and that the vehicle door handle is only exemplary.

Figure 1C:
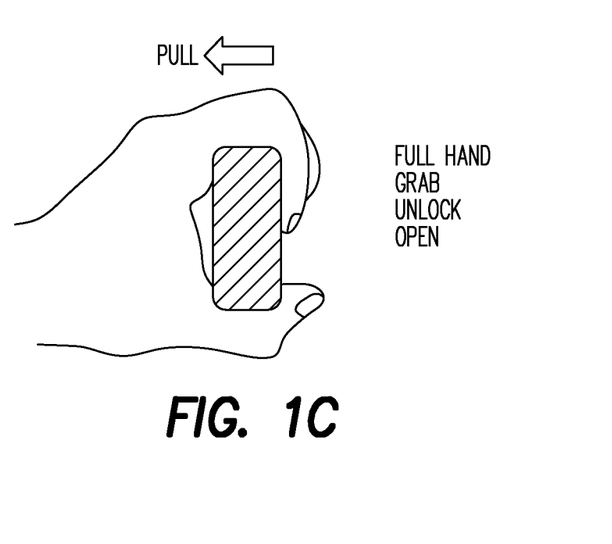

By mapping the location and intensity of the applied forces, and comparing such mapped information against pre-defined "force profiles"—that is, pre-defined profiles of forces of varying intensities and their locations—the present invention permits users to communicate different intentions by varying the intensity and/or location of force(s) applied to the vehicle door control. Thus, for example and without limitation, force profiles can be defined which correspond to: a user's intent to open the vehicle door by contacting both front and rear surfaces of the door handle with multiple fingers or the entire hand (FIGS. 1a and 1c); and a user's intent to enter a vehicle access or security code by contacting only a keypad disposed at the front surface of the handle (FIG. 1b). Upon mapping the location and intensity of the one or more user-applied forces detected by the at least one force sensing member, and comparing the mapped data to the pre-defined force profiles, the controller is operative to direct the execution of one or more pre-defined vehicle commands when the mapped data correspond to a pre-defined force profile associated with a vehicle command (such as, for instance, unlocking the vehicle's door(s), turning on exterior and/or interior lights, etc.).

As will be appreciated with the benefit of this disclosure, "force profiles" may be defined for any of a variety of user applied forces of various locations and intensities. Preferably, though not necessarily, such force profiles and the pre-defined vehicle commands associated therewith will correspond to the most natural application of user force to the handle (or other door control interface) to be associated with the desired vehicle command event. So, for instance, the application of force to a front surface of the handle would be associated with a user's intent to enter a security code via a keypad rather than, for instance, an intention to open (as opposed to simply unlocking) the vehicle door. Conversely, a user's application of force to front and rear surfaces of the handle simultaneously would be associated with a user's intent to actuate the handle in order to open the vehicle door, as opposed to an intent to enter an access or security code via a keypad.

It will be appreciated that the present invention permits a greater variety of user intentions to be determined and translated into vehicle commands, since sensing both the location and intensity of one or more user-applied forces yields more information about the user's intentions than can be obtained, for instance, from the capacitive type sensors or electro-mechanical switches more commonly employed in many vehicle door control systems. Further, the present invention will be understood to minimize, or even eliminate, the inadvertent effecting of vehicle commands occasioned by false signals (such as caused by moisture, interference, etc.), particularly as vehicle commands can be associated with mapped user interactions that are more easily distinguishable (by reason of intensity of force and location) from conventional false signals.

Figure 2:
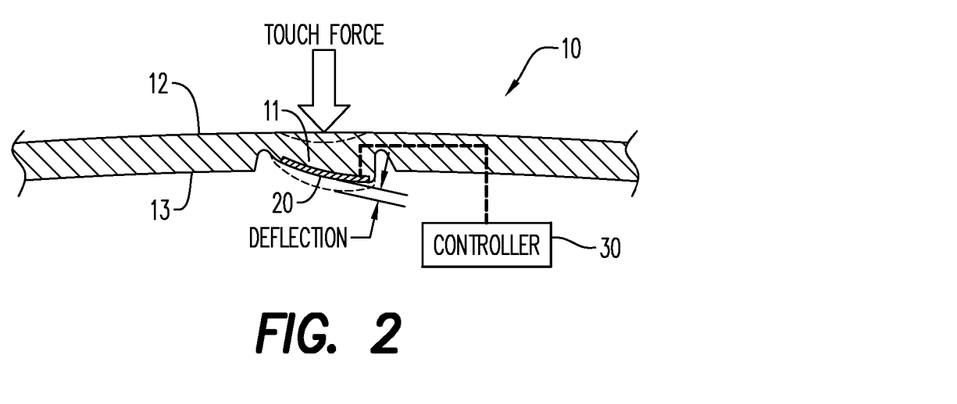
FIG. 2 is a simplified cross-sectional view of a vehicle door handle according to one embodiment of the invention, wherein strain relief gages are employed as force sensing members.

Referring now to FIG. 2, the invention according to one embodiment may take the form of a vehicle door handle 10 (shown in simplified cross-section) incorporating at least one strain gage 20 as a force sensing member. According to this embodiment, the handle 10 includes a resiliently deformable portion 11 that is at least partially constructed from a material that is temporarily deformable upon the application of force thereto by a user. Each deformable portion 11 is selected to deflect by a known amount in response to a given amount of force applied thereto. Positioned in or adjacent to each deformable portion 11 is at least one strain gage 20 of conventional construction. Each strain gage 20 is operative to measure the amount of deflection, or strain, in the resiliently deformable portion 11 from the undeformed state thereof, depending upon the degree of deformation thereof (which, in turn, is a consequence of the amount of force applied thereto). Accordingly, each resiliently deformable portion 11 will be understood to define the force transferring member of the invention.

The controller 30, operatively connected to the at least one strain gage 20 (shown by the dashed line) maps the location and intensity of the one or more user-applied forces transferred via the resiliently deformable portion 11 and detected by the each strain gage 20 and, compares that mapped data to pre-defined force profiles, and, when the mapped data corresponds to a pre-defined "force profile"," directs the execution of one or more pre-defined vehicle commands corresponding to the determined "force profile." While the controller is shown schematically in FIG. 2, it will be appreciated that the controller may comprise a printed circuit board ("PCB") or the like disposed within the handle or, alternatively, disposed elsewhere in the vehicle.

As will be apparent from the foregoing, the handle 10 of FIG. 2 may be constructed to include multiple resiliently deformable portions 11 and associated strain gages 20, each positioned to correspond to areas on the handle that will be subject to user applied forces. These areas may include front 12 (i.e., facing away from the vehicle door) and rear 13 (i.e., facing toward the vehicle door) surfaces of the handle and, more specifically, may include areas corresponding to alphanumeric "keys" on a keypad defined on or adjacent to a surface of the handle.

In a variant of the foregoing embodiment, deflection or deformation of the temporarily deformable portion 11 of the handle 10 may be detected by an infra-red beam (not shown) that is broken by the resiliently deformable portion 11 in response to a user-applied force, or by an infra-red beam (not shown) that is reflected against a surface of the deformable portion (or a reflective material provided thereon). In either case, the infra-red beams define the force-sensing members, whereas the resiliently deformable material of the handle itself constitutes the force transferring member.

Turning now to FIGS. 3 through 8, there are shown embodiments of the present invention wherein the force sensing member or members comprise FORCE SENSING RESISTORS, or FSRs (Interlink Electronics, Inc., Camarillo, Calif.). In one exemplary form, FORCE SENSING RESISTORS include a sensing film comprising electrically conducting and non-conducting particles suspended in a matrix. The particles change resistance in a predictable manner following the application of force to the film's surface. More particularly, applying a force to the surface of the sensing film causes particles to touch the conducting electrodes, changing the resistance of the film. Further, a small applied force can generate a large resistance change for a low signal-to-noise ratio.

Conventionally, FSRs can be printed on flexible substrates or applied to plastic surfaces.

According to the embodiments of the invention described below, a plurality of FSRs can be disposed in a regular array, such as a grid. (See FIG. 3.) This grid defines a plurality of coordinates ($X_1$, $Y_1$; $X_1$, $Y_2$; $X_2$, $Y_1$; etc.) which the controller, operatively connected to the FSR array, is operative to map in location and intensity as user applied forces (e.g., finger touches) are detected at any of the various points on the FSR array. In this fashion, the invention is operative to generate a "force profile" of applied pressure over the area of the FSR.

Figure 3:
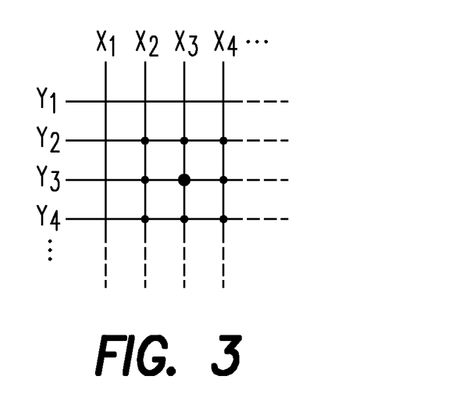
FIG. 3 is a simplified depiction of an array of FORCE SENSING RESISTORS.

Furthermore, an FSR array can be fashioned so as to sense applied forces on two opposite faces thereof. As will be appreciated from this disclosure, such an array can be positioned to detect the intensity and location of user-applied inputs on each of the opposite faces, which may be disposed so as to face opposite (front and rear) surfaces of a vehicle handle.

Figure 4A:
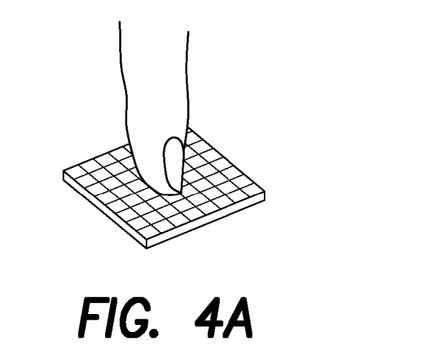
FIGS. 4a and 4b are simplified views of a vehicle door control utilizing a FORCE SENSING RESISTOR array.
Figure 4B:
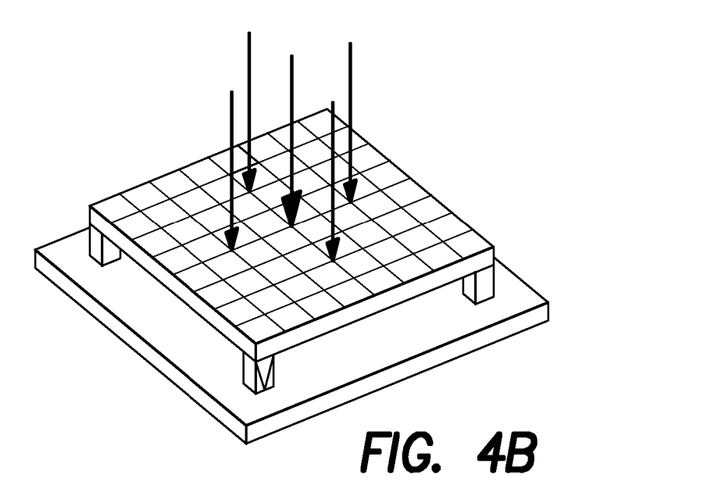

In one embodiment of the invention, shown in FIGS. 4a and 4b, the FSR array can be placed directly adjacent to the touch surface, which may be the front surface of a vehicle handle, a surface of the vehicle door panel, the B-pillar of the vehicle, etc. According to this embodiment, the force transferring member may be a deformable material on which may be provided (such as via printing or the like) indicia (such as numbers, letters, etc.) for entering a security or access code for locking/unlocking the vehicle, effecting pre-defined actions (locking/unlocking the vehicle, etc.), etc.

Turning to FIGS. 5 through 9, there are shown several embodiments of the present invention employing FSRs such as described above.

Figure 5:
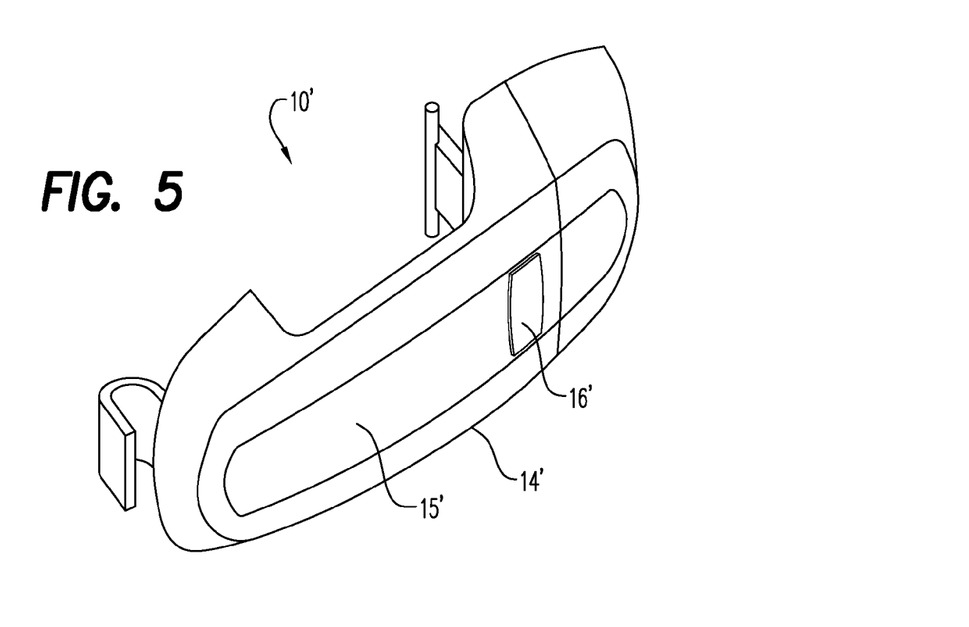
FIG. 5 is a perspective view of a vehicle door handle incorporating the door control of the present invention.

In the first such embodiment, shown in FIG. 5, it is contemplated that the switch or switches 16' in existing vehicle handle designs, such as the handle 10' exemplified in FIG. 5, may be replaced with the control of the present invention, according to which a controller and FSRs are disposed in the handle 10', with the FSRs being sealed from the outside environment by a resiliently deformable material defining the user-contacted portion of the switch and, thus, the force transferring member.

Figure 6:
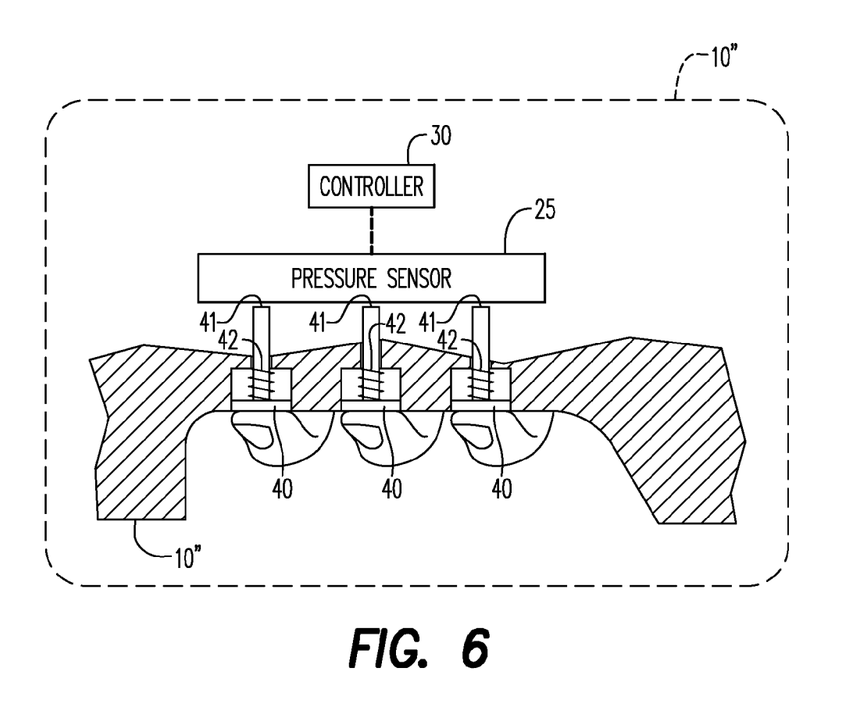
FIG. 6 is a simplified cross-sectional view of a vehicle door handle according to one embodiment of the invention, wherein FORCE SENSING RESISTORS are employed as force sensing members.
Figure 7:
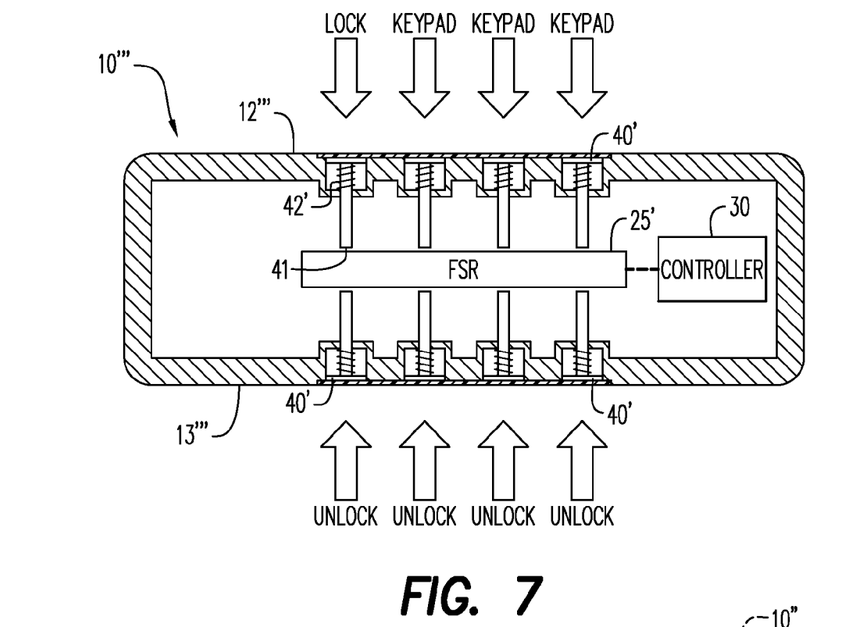
FIG. 7 is a simplified cross-sectional view of a vehicle door handle according to another embodiment of the invention, wherein FORCE SENSING RESISTORS are employed as force sensing members.

In the second embodiment, shown in FIGS. 6 and 7, the force transmitting members may comprise discrete, mechanical elements, such as the illustrated spring-biased keys or plungers 40, which are mounted in the door handle 10" so as to be accessible to the user. As will be appreciated, keys or plungers 40 may be sealed from the exterior of the handle, such as by the provision of a resiliently deformable plastic layer overlying the keys, etc. Alternatively, they may be exposed to the exterior of the handle body, and sealed with respect thereto via gaskets, etc. As shown, each plunger or key 40 includes a contact end 41 which contacts an underlying FSR 25 to convey the intensity of a user-applied force to the FSR. As shown, a plurality of keys or plungers 40 are provided, each being biased by a spring 42 or other biasing means to a default state in which each key or plunger is out of contact with the FSR.

According to the illustrated embodiment, the controller 30 is operative to receive (shown by the dotted line) from the FSR information respecting the location of each plunger or keys 40 contact therewith, as well as the intensity of the force transferred thereby, to map the location and intensity of the one or more user-applied forces, to compare the mapped data to pre-defined force profiles, and to direct and to direct the execution of one or more pre-defined vehicle commands depending upon the mapped location and intensity of the one or more user-applied forces as detected by the FSR. More specifically, it is contemplated that at least user actuation of each key or plunger 40 corresponds to a defined vehicle command and, moreover, that one or more combinations of user actuation of each key or plunger 40 also correspond to defined vehicle commands. So, by way of example only, the actuation of each plunger or key 40 separately may correspond to the entry of a component (e.g., number or letter) of a security code entered via a keypad, the actuation of all plungers or keys 40 simultaneously may correspond to a command to unlock the vehicle, and the simultaneous actuation of various combinations of two of the keys or plungers 40 may correspond to various other vehicle commands.

Referring specifically to FIG. 7, there is shown a variant of the foregoing embodiment in which the force sensing member 25'—the FSR—comprises FSR sensors disposed on opposite surfaces thereof. According to this embodiment, keys or plungers 40' are provided on both of the front 12 and rear 13 surfaces of the vehicle handle 10'''. As will be appreciated, the provision of user-actuatable keys or plungers 40' on each surface of the handle provides a greater variety of vehicle commands that can be effected. So, for example, a plurality of the keys or plungers 40' provided on the front surface of the handle may correspond to the various keys of a keypad (designated by the arrows labeled "Key Pad") for entry of a vehicle access code, as well as a separate "lock" key (designated by the arrows labeled "Lock") for effecting locking of the vehicle. Also for example, the detected actuation of keys or plungers 40' provided on the rear surface 13''' of the handle may correspond to a command to unlatch and/or unlock the vehicle door (as designated by the arrows labeled "Unlock").

Figure 8:
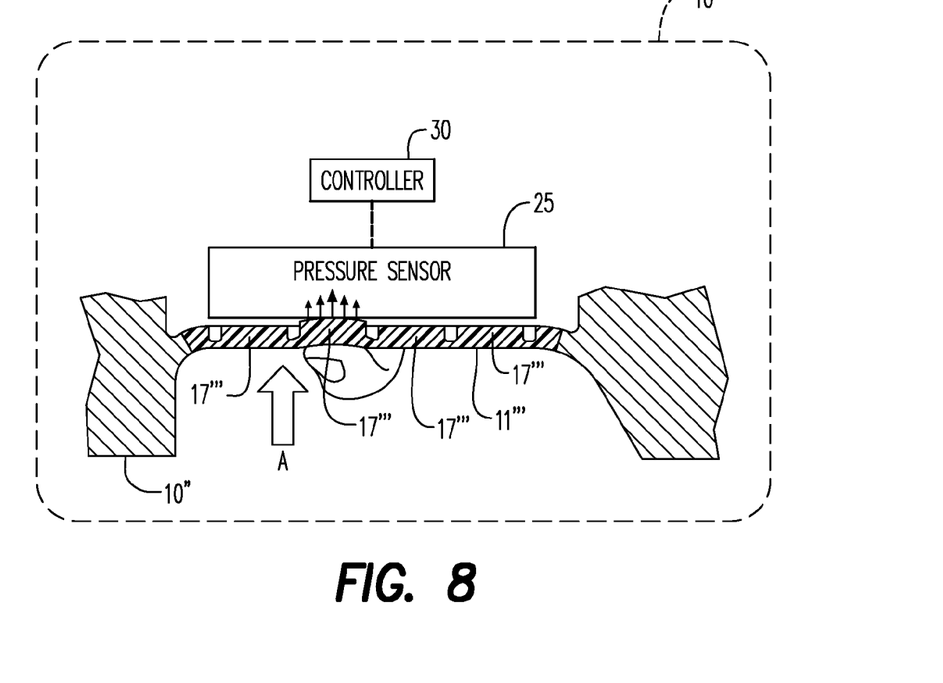
FIG. 8 is a simplified cross-sectional view of a vehicle door handle according to a still further embodiment of the invention, wherein FORCE SENSING RESISTORS are employed as force sensing members.

Referring next to FIG. 8, there is shown an embodiment of the present invention where the force transferring member comprises a resiliently deformable component of the vehicle handle 10'''', such as a flexible beam 11'''' or other deformable member, incorporated into the handle surface. According to this embodiment, user application of force to the force transferring component deforms that component and urges it into contact (in the direction of arrow A) with the underlying FSR 25 at one or more locations. The detected location and intensity of this contact, as mapped by the controller 30, is translated into vehicle commands in the manner as heretofore described. The one or more locations of potential contact between the deformable component can be defined by various projections 17'''' of the same or varying heights defined on the underside of the deformable component 11''''—that is, the side of the deformable component facing the FSR 25.

Figure 9:
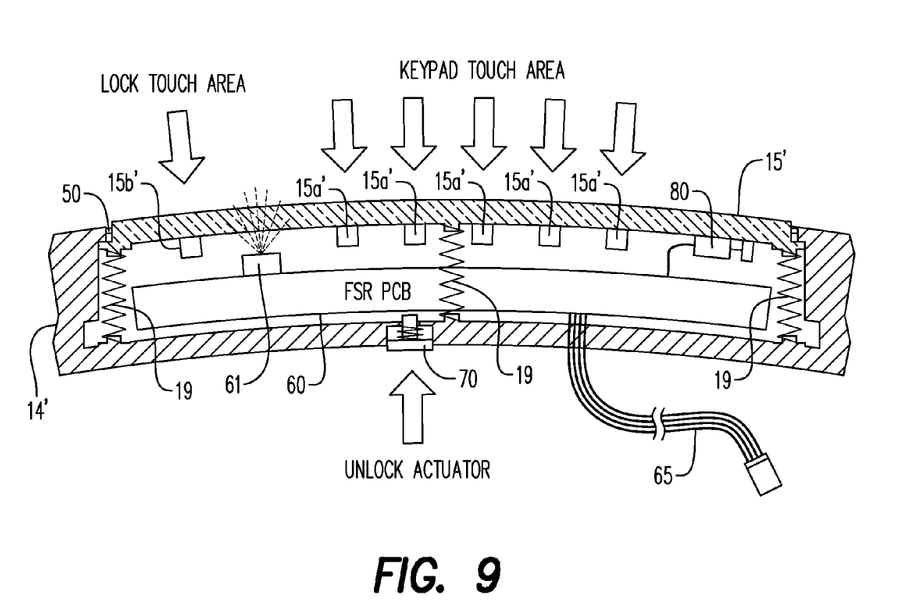
FIG. 9 is a simplified cross-sectional view of a vehicle door handle according to a yet another embodiment of the invention, wherein FORCE SENSING RESISTORS are employed as force sensing members.

In one form, depicted in FIG. 9, the force transferring member may take the form of a moveable and resiliently deformable component, such as the illustrated lens 15' forming part of the vehicle door handle (see FIG. 5). Of course, the lens 15' is only exemplary, and it will be understood that the moveable and resiliently deformable component may be one or more other components of the vehicle or vehicle door handle, including, by way of non-limiting example, handle trim components.

Still more particularly, lens may be seen to be movably mounted on handle body member 14' with an FSR sensor array disposed there-beneath. Lens 15' is captured in handle body 14' so as not to be removable therefrom. Lens 15' is biased, such as by springs 19' or other biasing means, into a default position in which lens does not contact the FSR sensor. A sealing gasket 50 may be disposed between the periphery of lens 15' and handle body 14' to seal the interior area against the external environment, the ingress of moisture, etc. According to the embodiment particularly illustrated, handle body 14' comprises only a portion of the handle 10' (exemplified in FIG. 5), and more specifically a cover portion which overlies a separate base portion of the handle (not shown). As depicted, handle body 14' defines an internal space beneath the lens 15'. The FSR (described further below) is disposable in that space.

The underside of lens 15' includes a plurality of projections 15a', each of which may contact the FSR array in response to movement and deformation of the lens 15' upon application of force thereto by a user. The arrangement of projections 15a' will be understood to correspond to a desired map of location-effected vehicle commands. For instance, the lens 15' may include indicia defining a "keypad," with projections 15a' arranged beneath those indicia so that, upon user applied force on various ones of the indicia corresponding to a pre-defined access code for the vehicle, corresponding locations on the FSR array will be contacted by the projections 15a'. The lens 15' may further define a "lock button" location with a corresponding projection 15b'. The projections 15a', 15b' may be formed as part of the lens 15', or may be formed separately and physically connected thereto.

User-applied force at the "lock button" is translated to the FSR by local movement or deformation of the lens 15', while the sensed contact between the projections 15a', 15b' and FSR is translated by the controller as a pre-defined command to lock the vehicle.

Consistent with the foregoing, it is understood that the lens is made of a material that exhibits, upon the application of force thereto by a user, a degree of deformability or deflection suitable to operation in the manner herein described.

FSR array may be provided on a printed circuit board ("PCB") also comprising the controller. PCB 60 may also include one or more LEDs 61 for selectively illuminating the lens 15', including, for instance, in response to contact between any one or more of the projections 15a', 15b' and the FSR. The PCB 60 is coupled, such as through a wiring harness 65, to a power source in the vehicle, as well as one or more other controllers, such as the vehicle's body control module, for effecting, in otherwise known fashion, the vehicle commands as determined by the controller. Alternatively, or in addition, it will be appreciated that PCB 60 may also be locally programmed with the pre-defined vehicle commands, or some of them, and operative to effect those commands when the mapped location and intensity information received from the at least one force sensing member corresponds to a pre-defined force profile associated with a vehicle command.

Wiring harness 65 may also convey signals from elsewhere in the vehicle for effecting actions at the handle such as, by way of example, illumination of the LED to indicate when the vehicle is in a locked or unlocked state.

Also per the embodiment of FIG. 9, the FSR sensor portion of the PCB 60 is double-sided in the form as described hereinabove, with one sensing surface facing the front of the handle and the other sensing surface facing the rear of the handle. There is, moreover, provided a spring-biased plunger 70 extending through the body 14' and projecting outwardly toward the interior of the handle (not depicted). Plunger 70 operates much like the keys or plungers described elsewhere herein, and is positioned to contact the FSR, in response to deformation of the handle core upon a user's grabbing the rear surface of the handle. According to the illustrated embodiment, such contact is mapped by the controller as corresponding to a pre-defined action to unlock the vehicle. Per this embodiment, it will be appreciated that the handle core includes a deformable portion which is deformed or deflected upon a user's application of pressure thereto, which deformable portion in turn contacts the plunger 70 to effect the translation of the user-applied force to the FSR.

Still further, a haptic actuator 80 may be provided to give user feedback, such as a physical vibration of the lens 15', upon a user's application of force to the lens 15'. The haptic actuator 80 may, for instance, be electrically connected to the PCB 60.

With respect to any of the aforedescribed embodiments, it is contemplated that the controller may be programmed to accept a pre-defined range of intensities and locations defined around a specific intensity and location nominally constituting the force profile necessary to effect an associated vehicle command. In this fashion, the invention recognizes various combinations of force intensities and locations within the pre-defined range of intensities and locations, thereby permitting user actuation of the vehicle door control even when the nominal force profile is not exactly met. Furthermore, the controller may be programmed to learn the "activation threshold" for each pre-defined force profile. In other words, the controller may be programmed to set each pre-defined force profile, from among the various combinations of force intensities and locations within the pre-defined range of intensities and locations, according to the particular intensity and location of the force applied thereto by one or more users. Alternatively, or in addition, it is contemplated that the controller may be programmed to learn each pre-defined force profile by one or more users, and to have those learned force profiles associated with one or more vehicle commands. So, by way of non-limiting example, it is contemplated that a vehicle user could, by any of various means, enter a "learning" mode of the door control, from which mode the user would be directed to touch the door handle to effect the transfer of force through any of the one or more force transfer members provided in order to create a force profile to associate with a pre-defined vehicle command. Still more particularly, the user might be instructed to enter, in the foregoing fashion, a force profile for the command effecting the unlocking of the vehicle. In response to that instruction, the user would then tough or grab the handle, via any of the one or more force transferring members, to define the force profile to associate with that vehicle command. The controller would then memorize the map of that particular force profile and associate it with the vehicle "unlock" command. It will be appreciated that, using smart "key fob" technology, whereby a vehicle may be programmed to recognize different vehicle users through distinct "key fob" codes and associate each such user with particular vehicle settings, that the controller may likewise be modified to associate, through the same technology, individual vehicle users with unique force profiles learned in the manner heretofore described.

It is important to note that the construction of the present invention as shown and described in this specification is illustrative only. And although several embodiments of the present invention are described in detail herein, those skilled in the art will appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements show as multiple elements may be integrally formed, the operation of the interfaces may be reversed or otherwise varied, the length of width of the structures and/or members or connector or other elements of the system may be varied. It is also be noted that the elements and/or assemblies of the exemplary embodiments may be constructed from any of a wide variety of material that provide sufficient strength or durability, in any of a wide variety of colors, textures and combinations.

Accordingly, all such modifications are intended to be included within the scope of the present innovations. Other substitutions, modifications, changes and omissions may be made in the design, operating conditions and arrangement of the preferred and other exemplary embodiments without departing from the spirit of the present invention.

The invention in which an exclusive property or privilege is claimed is defined as follows:

1. A user-actuatable vehicle door control, comprising:
    at least one force sensing member disposed beneath a plurality of force transfer members, the at least one force sensing member operative to detect the intensity of forces applied thereto, and each of the plurality of force transfer members independently moveable, discretely from the other ones of the plurality of force transfer members, upon user application of force thereto so as to transfer the user-applied force to a unique location on the at least one force sensing member via the force transfer member; and
    a controller operatively connected to the at least one force sensing member, wherein the controller operates to:
        map the location and intensity of each user-applied force as transferred via each force transfer member and detected by the at least one force sensing member;
        compare the mapped location and intensity information received from the at least one force sensing member to pre-defined force profiles, each pre-defined force profile corresponding to at least one pre-defined vehicle command; and
        direct the execution of one or more of the pre-defined vehicle commands when the mapped location and intensity information received from the at least one force sensing member corresponds to a pre-defined force profile associated with a vehicle command;
    wherein each pre-defined force profile corresponds to a different map of location and intensity information.

2. The vehicle door control of claim 1, wherein the vehicle command is selected from the group consisting of unlatching one or more of the vehicle's doors, turning on one or more of the vehicle's interior lights, turning on one or more of the vehicle's exterior lights, starting the car's engine, turning off one or more of the vehicle's interior lights, turning off one or more of the vehicle's exterior lights, recognition of at least a portion of an access code, and unlocking one or more of the vehicle's doors.

3. The vehicle door control of claim 1, wherein each at least one force sensing member is one of a strain gage, an optical sensor, an infra-red sensor, or a force sensing resistor.

4. The vehicle door control of claim 1, wherein the vehicle door control is embodied in a door handle having front and rear surfaces.

5. The vehicle door control of claim 4, wherein at least one force transfer member is provided proximate each of the front and rear surfaces of the handle, and wherein the at least one force sensing member is operative to detect the intensity of forces applied thereto via each force transfer member.

6. The vehicle door control of claim 4, wherein at least one force transfer member comprises a resiliently deformable portion that is deflectable from an undeformed state thereof by a known amount in response to the application of a given amount of force, and the at least one force sensing member comprises a strain gage operative to measure the amount of deflection in the resiliently deformable portion from the undeformed state.

7. The vehicle door control of claim 1, wherein the controller comprises a printed circuit board.

8. The vehicle door control of claim 1, wherein at least one force transfer member comprises a resiliently deformable portion that is deflectable from an undeformed state thereof by a known amount in response to the application of a given amount of force, and the at least one force sensing member comprises an infra-red beam operative to measure the amount of deflection in the resiliently deformable portion from the undeformed state.

9. The vehicle door control of claim 1, wherein the at least one force sensing member comprises a plurality of force sensing resistors disposed in a regular array to define a plurality of predefined coordinates, and wherein further the controller is operative to map the location and intensity of each of the one or more user-applied forces using the predefined coordinates.

10. The vehicle door control of claim 1, wherein:
    the at least one force sensing member comprises a plurality of force sensing resistors; and
    the plurality of force transfer members comprise a plurality of mechanical elements which are selectively moveable between first and second positions, each mechanical element contacting at least one of the force sensing resistors in the second position thereof, and each mechanical element being biased to the first position thereof.

11. The vehicle door control of claim 1, further comprising a haptic device operatively connected to the control, and wherein the controller is further operative to actuate the haptic device to provide physical feedback to a user upon the application of force to the at least one force transfer member.

12. The vehicle door control of claim 1, wherein the pre-defined force profiles each correspond to a plurality of locations and intensities of user-applied forces.

13. The vehicle door control of claim 12, wherein each set of the plurality of intensities and locations of the user-applied forces for each pre-defined force profile define an activation threshold.

14. The vehicle door control of claim 13, wherein the activation threshold for each pre-defined force profile is learned by the controller and corresponds to a particular set of locations and intensities of forces applied by a user to the force transfer members for the given force profile.

15. The vehicle door control of claim 1, wherein the pre-defined force profiles include at least two distinct sets of force profiles associated with at least two distinct users, and wherein further the controller is operative to associate each distinct force profile set with a unique code associated with a distinct key fob carried by each distinct user, and to use only the force profile set associated with the unique code detected.

16. A user-actuatable vehicle door control, comprising:
    at least one force sensing member disposed beneath at least one force transfer member, the at least one force sensing member operative to detect the intensity of forces applied thereto, and the at least one force transfer member moveable upon user application thereto of one or more forces so as to transfer the one or more user-applied forces to one or more locations on the at least one force sensing member; and
    a controller operatively connected to the at least one force sensing member, wherein the controller operates to:
        map the location and intensity of each of the one or more user-applied forces as transferred via the at least one force transfer member and detected by the at least one force sensing member;
        compare the mapped location and intensity information received from the at least one force sensing member to pre-defined force profiles, each pre-defined force profile corresponding to at least one pre-defined vehicle command; and direct the execution of one or more of the pre-defined vehicle commands when the mapped location and intensity information received from the at least one force sensing member corresponds to a pre-defined force profile associated with a vehicle command;

wherein the at least one force sensing member comprises a plurality of force sensing resistors disposed in a regular array to define a plurality of predefined coordinates, and wherein further the controller is operative to map the location and intensity of each of the one or more user-applied forces using the predefined coordinates; and wherein the force transfer member comprises a deformable material which is directly contacted by a user, and the array of force sensing resistors are disposed directly adjacent the deformable material; and wherein each pre-defined force profile corresponds to a different map of location and intensity information.

17. The vehicle door control of claim 16, wherein the deformable material has indicia provided thereon, the indicia including one or more of numbers, letters and symbols representing one or more vehicle commands.

18. The vehicle door control of claim 16, wherein the door control is embodied in one of a vehicle door handle, the B-pillar of a vehicle, or the exterior surface of a vehicle door.

19. A user-actuatable vehicle door control, comprising:
at least one force sensing member disposed beneath at least one force transfer member, the at least one force sensing member operative to detect the intensity of forces applied thereto, and the at least one force transfer member moveable upon user application thereto of one or more forces so as to transfer the one or more user-applied forces to one or more locations on the at least one force sensing member; and a controller operatively connected to the at least one force sensing member, wherein the controller operates to:
map the location and intensity of each of the one or more user-applied forces as transferred via the at least one force transfer member and detected by the at least one force sensing member;

compare the mapped location and intensity information received from the at least one force sensing member to pre-defined force profiles, each pre-defined force profile corresponding to at least one pre-defined vehicle command; and direct the execution of one or more of the pre-defined vehicle commands when the mapped location and intensity information received from the at least one force sensing member corresponds to a pre-defined force profile associated with a vehicle command;

wherein the at least one force sensing member comprises a plurality of force sensing resistors, and the at least one force transfer member comprises a deformable component including one or more projections facing the at least one force sensing member, each projection arranged so as to be able to contact the at least one force sensing member as the at least one force transfer member is deformed; and wherein each pre-defined force profile corresponds to a different map of location and intensity information.

20. The vehicle door control of claim 19, wherein the one or more projections each extend to one of a plurality of distances from the deformable component.

21. The vehicle door control of claim 20, wherein the plurality of distances are the same.

22. The vehicle door control of claim 20, wherein the plurality of distances are different.

23. The vehicle door control of claim 20, wherein at least two of the plurality of distances are different.

24. The vehicle door control of claim 7, wherein the printed circuit board comprises one or more LEDs, and wherein further the controller is operative direct the selective illumination of one or more of the one or more LEDs when the mapped location and intensity information received from the at least one force sensing member corresponds to a pre-defined force profile associated with a vehicle command.

* * * * *